Figures 1, 2:
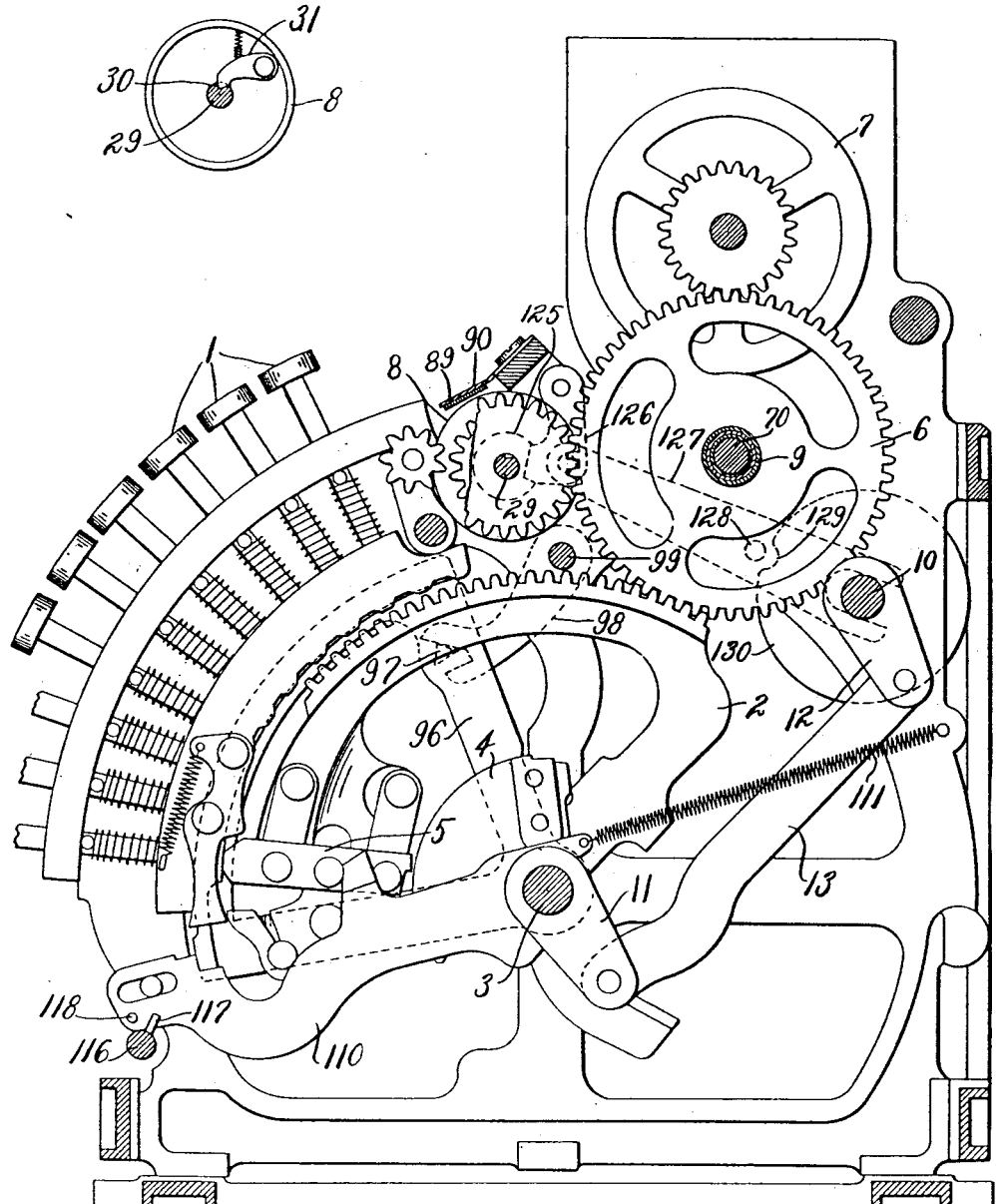

L. GRUBER.
CASH REGISTER.
APPLICATION FILED OCT. 30, 1911.

1,108,901.

Patented Sept. 1, 1914.

4 SHEETS—SHEET 1.

Witnesses
H. F. Sadgebury
WM. McCarthy

Inventor
Louis Gruber
by R. C. Slane
and O. H. Braselton
Attorneys

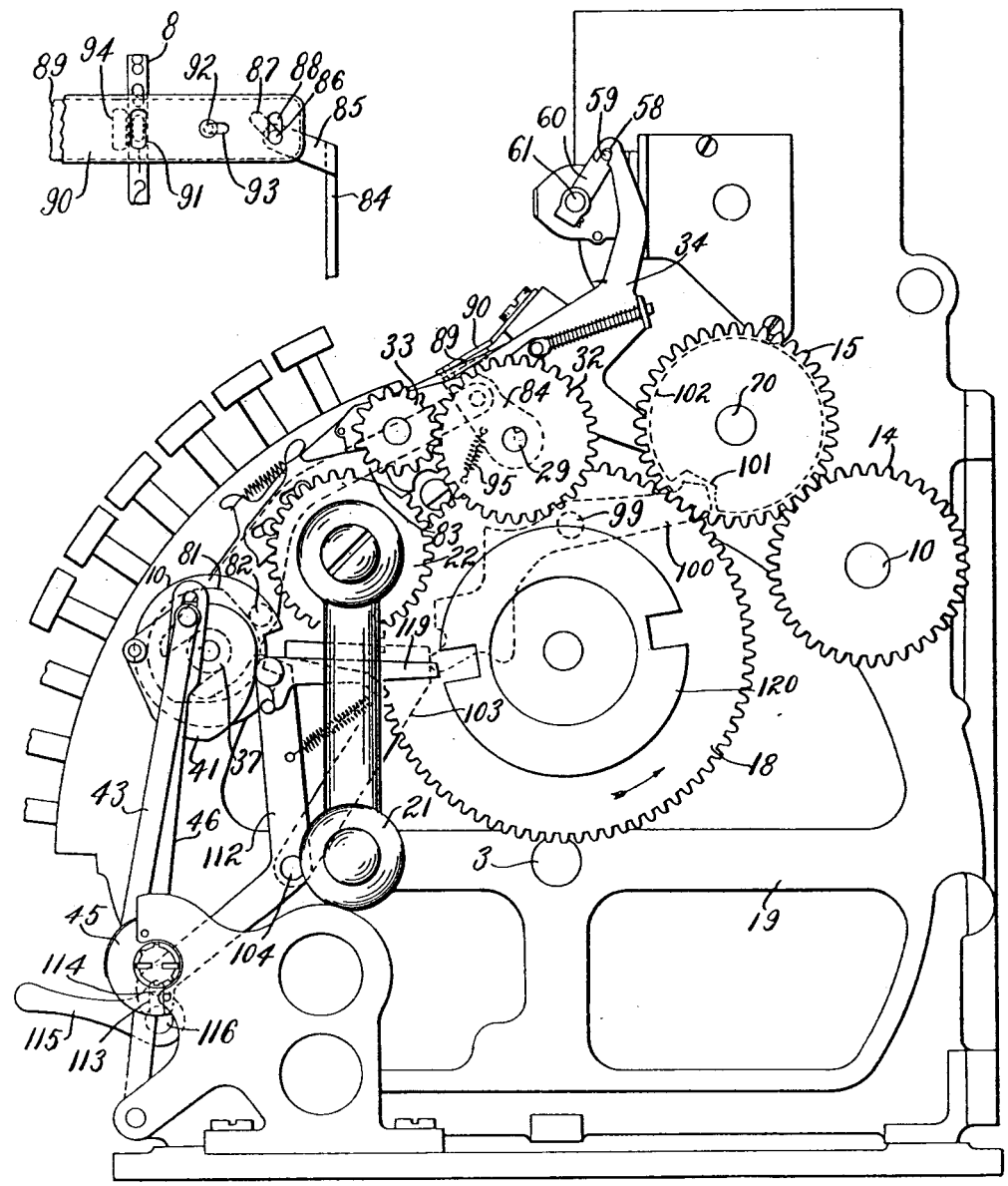

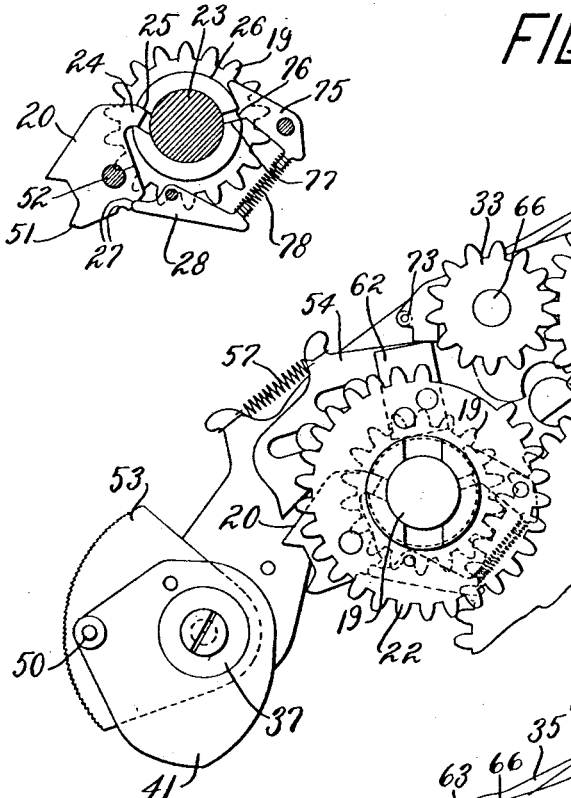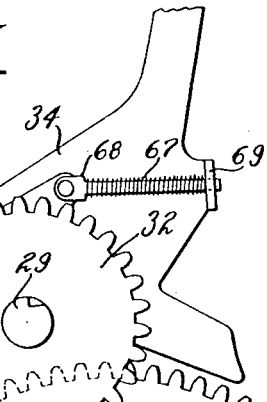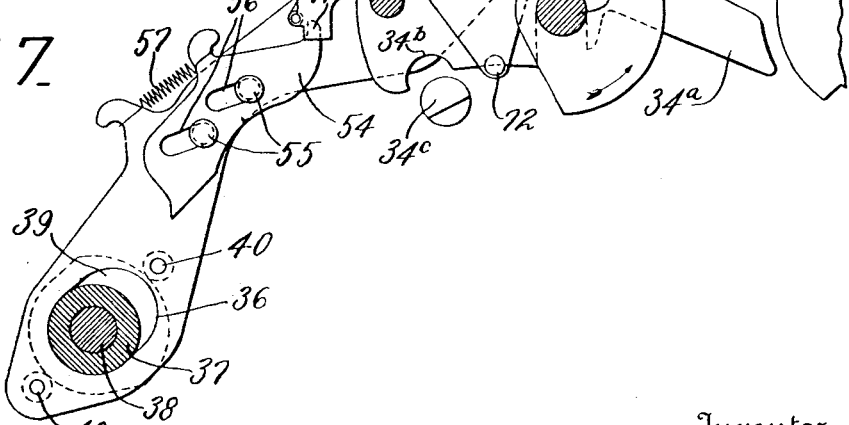

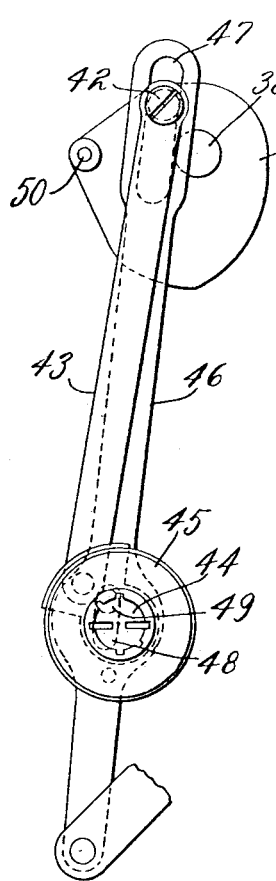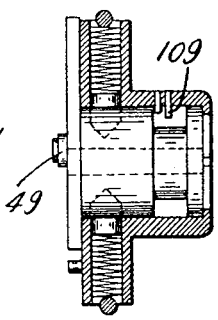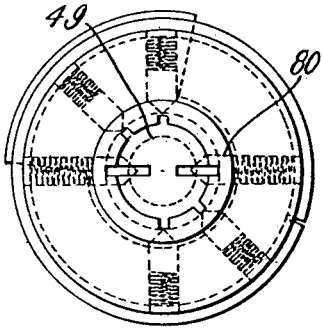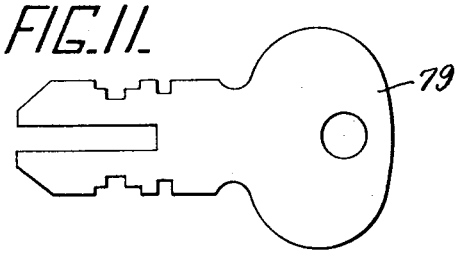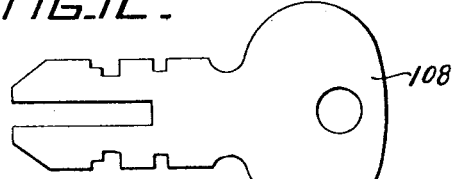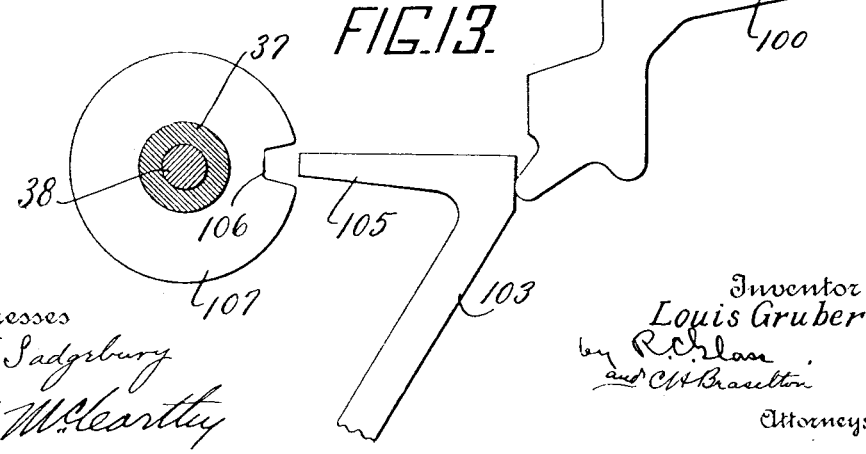

UNITED STATES PATENT OFFICE.

LOUIS GRUBER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,108,901. Specification of Letters Patent. Patented Sept. 1, 1914.

Application filed October 30, 1911. Serial No. 657,422.

*To all whom it may concern:*

Be it known that I, LOUIS GRUBER, a citizen of the United States, residing at Dayton, in the county of Montgomery and State of Ohio, have invented certain new and useful Improvements in Cash-Registers, of which I declare the following to be a full, clear, and exact description.

This invention relates to accounting machines and more particularly to the mechanism for clearing or resetting the accumulator thereof.

The principal object of this invention is to provide an operating device which is common to the machine proper and to the resetting means for the accumulator of the machine, the said operating device being normally in operative relation with the machine proper, with provisions for disestablishing the operative relation between the machine proper and the operating device and establishing an operative relation between said operating device and the resetting means for the accumulator.

Another object of this invention is to provide means for preventing the disestablishing of the operative relation when once established between the operating device and the resetting means until said resetting means has been actuated by the operating device.

A further object of this invention is to provide a concealing means for the accumulator with provision for withdrawing said means out of concealing position as an incident to the establishing of operative relation between the operating device and the resetting means for said accumulator. the said concealing means being also capable of being withdrawn from concealing position without establishing an operative relation between the operating device and the resetting means.

With these and incidental objects in view the invention consists in certain novel features of construction and combinations of parts the essential elements of which are set forth in the appended claims and a preferred form of embodiment of which is hereinafter shown with reference to the drawings which accompany and form part of this specification.

Figure 1 is a central transverse sectional view through a machine of the type shown in the patent to Cleal and Reinhard granted April 13, 1897, and numbered 580,378, to which type of machine the hereinafter described improvements have been shown as applied. Fig. 2 is a detail view of one of the accumulating wheels and the shaft supporting same. Fig. 3 is an end elevation of a machine of the type shown in said patent showing the operating device for the machine proper and for the accumulator resetting means. Fig. 4 is a partial top plan view of the concealing means for the accumulator. Fig. 5 is an enlarged view of the driving gear for actuating the main operating mechanism of the machine and also for actuating the resetting means for the accumulator. Fig. 6 is a detail view partly in section showing the pawl for connecting the driving device and the operating mechanism of the machine. Fig. 7 is an enlarged view of the mechanism for connecting the resetting means for the accumulator to the driving device, which mechanism is under control of a manipulative device. Fig. 8 is a detail view of the lock and connections for establishing operative relation between the driving device and either the operating mechanism of the machine or the resetting means for the accumulator. Fig. 9 is an enlarged front view of the lock which controls the mechanism for connecting and disconnecting the driving device with either the operating mechanism of the machine or the resetting means for the accumulator. Fig. 10 is a vertical section through the lock shown in Fig. 9. Figs. 11 and 12 are detail views of the different types of keys for operating the lock shown in Figs. 9 and 10. Fig. 13 is a detail view of the mechanism for preventing the operation of the lock shown in Fig. 9 after the machine proper has been released, the said mechanism also preventing the release of the operating mechanism of the machine when the lock has first been operated.

Described in general terms the machine to which the improvements have been shown applied is provided with a plurality of banks of amount keys which control the differential movement of actuators for the indicating, printing and accumulating elements. These actuators receive their differential movement from the main operating mechanism, which is constructed to be driven by a device normally connected thereto. The accumulating elements are provided with a resetting means therefor which is constructed to be operated by the before mentioned driving device, which driving device is normally disconnected from said resetting means. Manipulative devices and connections are provided for disconnecting the driving device from the operating mechanism and connecting said device with the resetting means for the accumulator. When operative relation is established between the driving device and the resetting means, mechanism is brought into play for preventing the disestablishing of such operative relation until said resetting means has been actuated by the driving device, upon the actuation of which the preventing means is automatically disabled so as to permit the establishment again of an operative relation between the driving device and the operating mechanism of the machine. Means is provided for concealing the accumulating elements while the driving device is connected with the operating mechanism. Two different manipulative devices are provided, one of which disconnects the driving device from the operating mechanism and connects said driving device with the resetting means, and at the same time withdraws the concealing means. The other manipulative device when operated prevents the release of the operating mechanism. When the driving device is connected to the resetting means by the operation of the first mentioned manipulative device, a counter is actuated which counter acts as a tell tale to inform the proprietor of the number of times the accumulator has been cleared or reset to zero.

Each bank of amount keys 1 (Fig. 1) controls the differential movement of an actuating segment 2, which is loosely mounted upon a shaft 3. Secured to this shaft 3 and adjacent to each segment 2 is a segment plate 4, which is given an invariably reciprocatory movement at each operation of the machine. This plate 4, when a key of the corresponding bank is depressed, engages with a latching mechanism 5 secured to the actuating segment and moves said segment until said latching mechanism is disconnected from plate 4 by the depressed key 1. This differential movement of the actuating segment 2 is transmitted by an intermediate gear 6 to the indicating and accumulating elements 7 and 8 respectively, as is well known and fully described in the aforementioned Cleal and Reinhard patent. Each of the intermediate gears 6 is secured to the inner end of one of a series of nested sleeves 9, which sleeves at their outer ends are provided with type carriers (not shown), for recording the items indicated and accumulated in a manner well known in the art. The shaft 3 is connected to the main operating shaft 10 of the machine by cranks 11 and 12 projecting from the shafts 3 and 10 respectively, which cranks are connected by a link 13. As the shaft 10 is rotated the crank 12 will be carried therewith, and through the link 13 and crank 11 impart a rocking movement to the shaft 3 which shaft, as before mentioned, carries the segmental plates 4.

The segmental plates 4 and operating connections above described form the main operating mechanism of the machine and this operating mechanism is driven in the following manner: Secured to the outer end of the shaft 10 (Fig. 3) is a gear 14, which meshes with a similar gear 15, that in turn meshes with a large intermediate gear 18 suitably secured to one of the side frames 17 of the machine. This intermediate gear 18 (Fig. 5) meshes with a pinion 19 which pinion is normally connected by a pawl 20 to a driving device herein shown as a crank handle 21, but it is to be understood that the term driving device as used in the specification and claims is not to be limited to the manually operated device herein shown but is to include other forms of driving device whether the same are manually or power operated. The clutch pawl 20 is pivotally mounted upon a gear 22, which is secured to the crank handle 21, the said gear 22 and crank handle being mounted upon a stub shaft 23, upon which is also mounted the pinion 19. The clutch pawl 20 is provided with a nose 24, which normally engages a notch 25 formed in the hub 26 of the pinion 19 so that when the crank handle 21 is revolved, the pinion 19 will rotate therewith. The above described gearing is so proportioned that for each two rotations of the crank handle 21, the main operating shaft 10 of the machine will be given one complete rotation. The pawl 20 is also provided with two notches 27 into which one end of a retaining pawl 28 plays. This pawl is pivoted to the gear 22 and normally holds the nose 24 of the clutch pawl 20 in the notch 25 of the hub 26, as clearly shown in Fig. 6.

From the above description it will be seen that while the clutch pawl is in engagement with the hub of the pinion 19 any movement of the driving crank handle will be conveyed to the operating mechanism of the machine, and it will also be seen that said pawl 20 may be readily disconnected from the hub of the pinion 19 in which case the driving crank handle can be rotated independently of said operating mechanism. When this pawl is disconnected from the hub of the pinion 19, the driving device is brought into operative relation with the resetting mechanism which is about to be described so that upon the rotation of the driving device the resetting mechanism will be actuated to clear or reset to zero the elements of the accumulator.

The accumulator elements 8 are mounted upon a shaft 29 (Fig. 2) which is provided with a longitudinal groove 30, with which pawls 31 pivoted to the accumulating elements 8 coöperate so that upon the rotation of said shaft 29 the accumulating elements will be reset to zero, as is well known in the art. This shaft 29 at its right hand end has secured thereto a gear 32, with which meshes a pinion 33 rotatably mounted upon the lower forward edge of a lever 34 which is pivoted loosely upon the accumulator shaft 29 (Fig. 7). The upper end of a slide 35 is pivoted to the lever 34 above the shaft 29 and the lower end of said slide 35 is provided with an elongated slot 36, through which extends a guiding disk or hub 37 loosely mounted upon a stub shaft 38. Secured to the inner end of this disk or hub is a cam plate 39, with which rollers 40 projecting from the slide 35 engage. This disk or hub 37 is provided with a series of plates for performing different functions, the outermost one of which plates 41 (Figs. 3 and 8) has projecting therefrom a crank pin 42 to which is connected the upper end of a link 43, the lower end of said link being suitably secured to the barrel 44 of the lock 45. The purpose of this link 43 is to convey the movement of the lock barrel 44 to the plate 41 secured to the disk or hub 37. As this lock barrel 44 in some instances is given a movement of at least 180°, the link 43 in such instances would not be sufficient to impart a similar movement to the plate 41, owing to the fact that instead of the upper end of the link passing over the dead center of the stub shaft 38 and the lock barrel 48 it would be returned to its normal position by the continued movement of the lock barrel, and for this reason an extra link is provided to carry the upper end of the link 43 beyond dead center. This extra link 46 is pivoted to the frame work of the machine below the barrel 44 of the lock, as shown in Fig. 8 and at its upper end is provided with an elongated slot 47 through which extends the crank pin 42 projecting from the plate 41. This link 46 is also provided with an elongated slot 48 through which extends a pin 49 projecting from the lock barrel 44. From this it will be obvious that by the employment of the link 46, the upper end of the link 43 will be carried beyond its dead center so that the plate 41 will receive substantially the same movement as the lock barrel 44. This plate 41 has projecting therefrom a pin 50, which when the lock barrel is given a movement of 180° will engage with the lower one of a pair of prongs 51 extending from the clutch pawl 20 and rock said pawl about its pivot 52 to uncouple the nose 24 from the hub 26 of the pinion 19, the clutch pawl 20 being held in its adjusted position by the retaining pawl 28 which will engage the other one of the notches 27 formed in the underside of said pawl 20. This rotation of the plate 41 by the links 43 and 46 driven by the lock barrel 44 will, through the guiding hub 37 (Fig. 7), impart a similar degree of movement to the cam plate 39, which plate by engaging with the rollers 40 will lower the slide 35. This lowering of the slide 35 will rock the lever 34 in an anticlockwise direction (Fig. 7) so as to carry the pinion 33 into the path of movement of the driving gear 22 fast to the crank handle 21. Upon the rotation of the operating handle with the parts in the position just described, the gear 22 will, through the pinion 33, rotate the gear 32 and the shaft 29 to which the latter gear is secured. This rotation of the shaft 29 will, through the longitudinal groove 30 and pawls 31 (Fig. 2), reset the accumulating elements 8 to zero.

When the lever 34 is rocked by the downward movement of the slide 35 as above described, an extension 34$^a$ thereof will contact with the surface of a disk 102 secured to the gear 15 and a recess 34$^b$ formed on the forward under edge of the lever will embrace a stud 34$^c$ for the purpose of preventing any strain upon the slide 35 caused by the tendency of the lever 34 to rotate in an anticlockwise direction, (Figs. 5 and 6) when the pinion 33 is being rotated by the gear 22.

The shaft 29 has a notched disk 125 (Fig. 1) secured thereto, into the notch of which normally projects the free end of a pivoted arm 126. The forward end of a link 127 is secured to the arm 126 and the rear end of said arm is slotted so as to straddle the shaft 10. Projecting from the link is a pin 128, which is arranged to enter a recess 129 formed in a disk 130 secured to the shaft, when said link 127 is moved rearwardly by the rotation of shaft 29 to reset the accumulator and thereby prevent the accidental rotation of the shaft 10. From this construction it is also obvious that during the rotation of the shaft 10 the accumulator shaft 29 will be prevented from rotation and consequently prevent the clearing of the accumulator.

The plate 39 has secured thereto a segmental ratchet plate 53, (Fig. 5) coöperating with which is a pawl 54, the latter being movably supported upon the slide 35 by pins 55 projecting from said slide and which extend through elongated slots 56 formed in said pawl. This pawl is held with the pins 55 in the rearward ends of the slots 56 by a spring 57, the ends of which are fastened to the pawl and the slide 35, as fully shown in Fig. 7. The segmental ratchet plate 53 is not brought into coöperative relation with the pawl 54 until after the first quarter turn of the hub 37 carrying said ratchet plate, the purpose of which is to enable the reading of the accumulator without resetting it to zero as hereinafter described. Immediately after the hub 37 passes beyond a quarter of a turn, the pawl 54 will engage with the teeth of the ratchet plate 53, it being understood that the slide 35 has been lowered so as to permit the engagement of the pawl with the ratchet plate.

The extreme upper end of the slide 34 (Fig. 3) is provided with a recess 58, in which plays a pin 59 projecting from an arm 60 secured to the operating shaft 61 of a well known form of counter, which counter is suitably secured to the side frame of the machine. The movement of the slide 34 is so timed as not to actuate the counter until the segmental plate 53 is in position to be engaged by the pawl 54. The purpose of the elongated slots 56 in said pawl 54 is to permit the plate 53 to ratchet by said pawl and also to permit the further lowering of the slide 34 after the pawl 54 has engaged the ratchet plate 53.

The ratchet plate 53 and the pawl 54 form means for preventing the disestablishment of operative relation between the driving device and the resetting means until the said resetting means is actuated by the driving device, during which actuation, mechanism is brought into play, as hereinafter described, for disabling said preventing means so that the driving device may be disconnected from the resetting means and an operative relation again established between the said driving device and the operating mechanism of the machine.

When the driving device is connected to the resetting means a stop device is employed to arrest the driving device when the accumulator has been cleared or reset to zero and this stop device is used for the purpose of disabling the aforementioned preventing means in a manner now to be described. Fast to the driving gear 22 and in the same plane as the pawls 20 and 28 is a block 62 (Fig. 5), which normally stands beneath the forward end of a lever 63 (Fig. 7), which lever at its center is provided with an elongated slot 64 through which projects a pin 65 extending from the lever 34. By this slot and pin construction the lever 63 has a pivotal and sliding movement upon the lever 34. The forward end of this lever is normally supported by a stub shaft 66, upon which is mounted the aforementioned pinion 33. This stub shaft 66 normally prevents the rocking of the lever 63 by its spring 67 which spring surrounds a pin 68, one end of the latter being fastened to the lever 63, while its other end passes through a flange 69 of the slide 34. When the slide 35 is lowered by the rotation of the cam plate 39, as previously described, the lever 34 carrying the pinion 33 will be rocked in an anticlockwise direction (Fig. 7) thereby lowering the stub shaft 66 out of supporting position for the lever 63, the said lever then being supported by the block 62 against the tension of its spring 67. Upon the rotation of the gear 22 carrying the block 62 by the crank handle 21 the said block will pass from under the forward end of the lever 63, which will permit the rocking of said lever by the spring 67, so that when the gear 22 completes its rotation the block 62 will contact with the forward edge of the lever 63 and move said lever rearwardly until the forward end of the slot 64 formed in said lever contacts with the pin 65, at which time the said lever will then form a positive stop for the gear 22.

It was stated that the pawls 20 and 28 carried by the gear 22 were in the same plane as the block 62, so that these pawls, if some mechanism were not provided for raising the forward end of the lever 63, would contact with said lever and arrest the driving device before the accumulator was cleared or reset to zero and for this reason the following mechanism is provided for lifting the forward end of the lever 63 out of the path of pawls 20 and 28 while said pawls are passing the forward end of said lever 63. To the shaft 29 is secured a cam plate 71 (Fig. 7) which plate engages with a roller 72 projecting from the lever 63 and raises the forward end of said lever while the pawls 20 and 28 are passing beneath the same, after which the said cam passes out of engagement with the roller 72 and permits the spring 67 again to lower the forward end of the lever so that the same will be in the path of the block 62 carried by the driving gear 22. As previously mentioned, this stop device controls the disabling of the means for preventing the disconnection of the driving device from the resetting means until said resetting means has been actuated by the driving device and this is accomplished in the following manner: Projecting from the forward end of the stop device or lever 63 is a stud 73 which when the lever is rocked down into position to act as a stop device for the gear 22, passes in front of an extension 74 of the pawl 54. Now when the lever or stop device 63 is moved rearwardly by the block 62 coming into contact with the forward end thereof, the stud 63 will contact with the extension 74 of the pawl 54 and draw said pawl rearwardly out of engagement with the teeth of the ratchet plate 53 so that the hub carrying said plate may be rotated in an anticlockwise direction by the lock barrel 44 and connections hereinbefore described.

As the hub 37 is rotated toward normal position, the slide 35 will be elevated which will rock the lever 34 so as to carry the pinion 33 out of operative relation with the driving gear 22 and this elevation of the pinion 33 will, through the stub-shaft 66 supporting said pinion, rock the stop device 63 from the path of the block 62, after which the spring 67 will force said lever or stop device forwardly into the position shown in Fig. 5. The return of the hub 37 to normal position will also carry the plate 41 back to its normal position and through the stud 50 projecting from said plate 41 engaging with the upper one of the fork members 51 of the pawl 20 rock said pawl so that its nose 24 will pass into the notch 25 of the hub 26 of the pinion 19 thereby establishing operative relation again between the driving device and the operating mechanism of the machine. A third pawl 75 is carried by the driving gear 22 (Figs. 5 and 6) which pawl is provided with a nose 76 that engages with a recess 77 in the hub 26 of the pinion 19 when the driving gear 22 and the pinion 19 are in normal position. The purpose of this pawl 75 is frictionally to hold the driving gear 22 in its proper position relative to the pinion 19 so that the nose 24 of the pawl 20 carried by the gear 22 may enter the recess 25 formed in the hub 26 of the pinion 19 when said pawl 20 is rocked by the stud 50 upon the return of the plate 41. A spring 78 is interposed between the pawls 28 and 75 carried by the driving gear 22 so as to hold said pawls in position to perform the functions for which they are intended.

Means is provided for normally concealing the accumulator, which means is under the control of a manipulative device in the form of a key which is arranged to operate the previously described lock 45. This key, which for the purpose of identification is called the proprietor's key, is constructed to impart different degrees of movement to the previously mentioned lock barrel. When the key rotates the lock barrel to one position it withdraws the concealing means of the accumulator from concealing position so that said accumulator may be read, and when said lock barrel is moved to its second position by the key, in addition to withdrawing the concealing means from the accumulator, the normal operative relation between the driving device and the operating mechanism of the machine will be disestablished, and an operative relation between said driving device and the resetting means of the machine will be established. This lock barrel is arranged to be operated also by another manipulative device which hereinafter will be referred to as the clerk's manipulative device or key, which key rotates the lock barrel in an opposite direction from that in which it is rotated by the proprietor's key. The object of this clerk's key is to provide means for preventing the operation of the machine which is accomplished by locking the machine lock which is, as usual, under the control of the clerk's keys of the machine. The concealing means for the accumulator is not effected by the operation of the clerk's manipulative device.

When it is desired to read the accumulator the proprietor's key 79 (Fig. 11) is inserted in the lock barrel 44 of the lock 45, which forces the plungers 80 out of said lock barrel so that it may be rotated. Upon rotating the lock barrel 44 forty-five degrees in a clockwise direction, a similar extent of movement will be imparted to the guiding disk or hub 37 by the link 43. This hub 37, as shown in Fig. 3, is provided with a cam plate 81 which, upon the rotation of the hub 37, engages with a roller 82 projecting from a link 83 which link at its upper end is fastened to an arm 84 loosely mounted upon the accumulator shaft 29, the lower end of said link being guided by the aforementioned hub 37. This movement of the link 83 by the cam plate 81 will rock the arm 84 in a clockwise direction. This arm 84 is provided with an offset 85 (Fig. 4), which has extending therefrom a pin 86 that projects through slots 87 and 88 formed in plates 89 and 90 respectively. The plate 90 extends across all of the accumulating wheels 8 and is suitably supported by the side frames of the machine. This plate is provided with a series of openings 91, one for each accumulating wheel which opening is large enough to expose one digit of each accumulating wheel. The plate 89 is supported on the plate 90 by pins 92, only one of which is shown, which extend through elongated slots 93 formed in the plate 90 and into the plate 89. The plate 89 is also provided with openings 94 which are similar to the openings 91 formed in the plate 90 and normally these openings 94 are out of alinement with the openings 91 of the plate 90, thereby concealing the digits of the accumulating wheels 8, but are arranged to be brought into alinement with the openings 91 upon the movement of the arm 84, as above described, which movement will be conveyed to the plate or slide 89 by the pin 86 extending from the offset 85 of the arm 84, which pin will engage the walls of the inclined slot 87 formed in the plate 89 and shift said plate to the right, thereby bringing the openings 94 into alinement with the openings 91 and enabling the reading of the digits of the accumulating wheels 8 below said openings.

If it is desired to clear or reset the accumulating wheels to zero, the proprietor's key or manipulative device is given an additional movement of 135 degrees or 180 degrees in all, so as to establish an operative relation between the driving device and the resetting means, which includes the gear 32 and pinion 33. This additional movement of the proprietor's manipulative device or key 79 does not impart any additional movement to the link 83 and consequently the concealing plate or slide 89 remains in position with its openings 94 in alinement with the openings 91 of the plate 90.

After the accumulator has been cleared or reset to zero by the operation of the driving device, the proprietor's manipulative device is turned back to normal position which permits the slide 89 and connections to return to normal position, in which position the slide 89 conceals the digits of the accumulating elements; the said slide and connections being returned by a spring 95 which is connected to the arm 84 and to the framework of the machine.

As is well known in this art, the type of machine to which the improvements have been shown applied is provided with a bank of clerks' keys, which are similar to the amount keys 1, and control an actuating segment 2 in a manner similar to the amount keys. Each bank of amount and clerks' keys is provided with a detent 96 (Fig. 1) which has projecting therefrom a lug 97. Cooperating with this lug 97 of the detent belonging to the clerks' bank of keys is an arm 98 shown in dotted lines in Fig. 1, which arm is secured to a shaft 99 extending across the machine. To the right hand end of this shaft 99 (Fig. 3) is secured a locking lever 100, the rearward end of which normally rests in a recess 101 formed in a disk 102 secured to the gear 15 and thereby locks said gear from rotation and consequently prevents the operation of the machine. By reference to Fig. 1 it will be seen that the forward end of the arm 98 projecting from the shaft 99 is so shaped that when the clerk's detent 96 is elevated upon the depression of one of the clerks' keys, the said shaft 99 will be rocked in a clockwise direction, which will withdraw the rearward end of the locking arm 100 (Fig. 3) out of the recess 101 formed in a disk 102, thereby leaving the gear 15 free to be rotated by the driving device 21. The forward end of the locking lever 100 contacts with the upper rear edge of an arm 103 which is pivoted as at 104 to the side frame 19. The arm 103 (Figs. 3 and 13) has a forwardly projecting portion 105 which when the locking lever is rocked by the operation of the clerk's key, as above described, to release the operating mechanism, will be forced into a recess 106 of the disk 107 secured to the previously mentioned hub 37 and thereby prevent the rotation of said hub by either the proprietor's key 79, as previously described, or by a clerk's manipulative device 108, as hereinafter described.

When the proprietor's manipulative device 79 is rotated for the purpose of either reading the accumulator or connecting the driving device with the resetting means for the accumulator, the disk 107 will be rotated so as to bring the surface thereof into the path of the extreme forward end of the arm 105 and thereby prevent the release of the locking arm 100, while the proprietor's manipulative device is in either of its two adjusted positions.

The clerk's manipulative device 108 (Fig. 12) is constructed to rotate the lock barrel 44 in an opposite direction from the proprietor's manipulative device, it being prevented from rotating in the same direction as the proprietor's key by pins 109 (Fig. 10) extending inwardly from the hub of the key lock 45. When this clerk's manipulative device is operated, the surface of the disk 107 (Fig. 13) will pass in front of the arm 105 thereby preventing the release of the lock lever 100 in a manner similar to that described in connection with the proprietor's key 79. The clerk's manipulative device 108 when operated, in addition to preventing the release of the operating machine, also prevents the latching of the amount keys in their depressed positions, the purpose of which is to prevent the accidental depression of an amount key while the clerk's manipulative device 108 is in its adjusted position, thereby preventing the registering of an amount unintentionally after the clerk's manipulative device 108 has been restored to its normal positon.

As is well known in the art and fully shown and described in the aforementioned Cleal and Reinhard patent, the amount keys 1 are latched in their depressed position by the detents 96 being held in elevated position by retaining bars 110, which are drawn rearwardly by springs 111 upon the elevation of the detents 96. It will be seen that if these retaining bars 110 (Fig. 1) are held from rearward movement, the detents 96 will be returned to their normal position upon pressure being removed from the amount keys 1, thereby preventing the latching of the keys 1 in their depressed position. When the lock barrel 44 is rotated in an anticlockwise direction (Fig. 9) by the clerk's manipulative device 108, the same degree of movement will be imparted to the hub 37 carrying the cam plate 41 by the link 43. As the cam plate 41 is rotated in an anticlockwise direction, it will cam the upper end of a centrally pivoted lever 112 rearwardly, while the lower end of said lever will move upwardly and forwardly. This lower end of the lever 112 is provided with a recess 113 (Fig. 3), into which a pin 114 projects. This pin 114 extends from a key release lever 115 secured to the shaft 116 extending across the machine beneath the forward ends of the retaining bars 110. From this it will be seen that as the lever 112 is rocked in a clockwise direction by the cam plate 41, the key release shaft 116 will be rocked in an anti-clockwise direction. This shaft 116 carries a series of pins 117 (Fig. 1) one for each retaining bar 110, which pins are arranged to contact with laterally extending studs 118 projecting from said retaining bars, when the shaft is rocked, as above described, and thereby hold the retaining bars in their forward positions against the tension of their springs 111 in case any amount keys are depressed, which prevents the latching of any of the amount keys in their depressed positions. Extending rearwardly from the upper end of the lever 112 is an arm 119, the extreme rearward end of which is arranged to contact with the surface of a disk 120 carried by the intermediate gear 18 and thereby prevent the operation of the key release lever 115 during the actuation of the operating mechanism by the driving handle 21.
From the above description, it will be seen that a common driving device has been provided for the operating mechanism of the machine and the resetting means for the accumulator, which driving device is either in operative relation with the operating mechanism or the resetting means, thereby doing away with the necessity of employing separate devices for resetting the accumulator to zero and for driving the machine.
Several well known styles of cash registers now upon the market employ separate detachable devices for resetting the accumulator to zero. Frequently these resetting devices become lost or mislaid necessitating the accumulation of several days' business into one grand total before another resetting device can be obtained, and also is frequently happens that an attempt is made to operate the machine while the resetting device is attached thereto with the result that the operation cannot be completed on account of the resetting device interfering with the driving device, thereby putting the machine out of commission until the arrival of a repairman to restore the parts to normal position. With the improved driving device these difficulties are overcome as hereinbefore fully described.

While the form of mechanism herein shown and described is admirably adapted to fulfil the objects primarily stated it is to be understood that it is not intended to confine the invention to the one form of embodiment herein shown and described but that it is susceptible of embodiment in various forms all coming within the scope of the claims which follow.

What is claimed is:—

1. In an accounting machine, the combination with an accumulator, of actuators therefor, operating mechanism for said actuators, a driving device for said operating mechanism normally connected thereto, resetting means for the accumulator and means for disconnecting the driving device and the operating mechanism and connecting said device with the resetting means so that upon the operation of the driving device while connected with the resetting means the accumulator will be cleared or reset to zero.

2. In an accounting machine, the combination with an accumulator, of actuators therefor, operating mechanism for said actuators, resetting means for the accumulator, a driving device common to the operating mechanism and the resetting means, and means for connecting the driving device with the resetting means or the operating mechanism at will.

3. In an accounting machine, the combination with an accumulator, of actuators therefor, operating mechanism for said actuators, resetting means, including a pinion for the accumulator, a driving gear common to the operating mechanism and the resetting means, a pawl normally connecting the driving gear and the operating mechanism, and means for operating the pawl and thereby disconnecting the driving gear and the operating mechanism and connecting the pinion of the resetting means and the driving gear.

4. In an accounting machine, the combination with an accumulator, of actuators therefor, operating mechanism for said actuators, resetting means for the accumulator, a driving device common to the operating mechanism and the resetting means, means for connecting the driving device with the resetting means or the operating mechanism at will, and a stop device positioned under the control of the connecting means for arresting the driving device after the latter has been operated to reset the accumulator.

5. In an accounting machine, the combination with an accumulator, of actuators therefor, operating mechanism for said actuators, resetting means for the accumulator, a driving device common to the operating mechanism and the resetting means, a manipulative device and connections for establishing operative relation between the driving device and either the operating mechanism or the resetting means, a stop device positioned under the control of the manipulative device for arresting the driving device after the accumulator has been reset, and means for withdrawing said stop device when an operative relation is established between the driving device and the operating mechanism.

6. In an accounting machine, the combination with an accumulator, of actuators therefor, operating mechanism for said actuators, resetting means for the accumulator, a driving device common to the operating mechanism and the resetting means, a manipulative device and connections for establishing operative relation between the driving device and either the operating mechanism or the resetting means, and mechanism for preventing the disestablishment of such operative relation when established between the driving device and resetting means until the latter means has been actuated by the driving device.

7. In an accounting machine, the combination with an accumulator, of actuators therefor, operating mechanism for said actuators, resetting means for the accumulator, a driving device common to the operating mechanism and the resetting means, a manipulative device and connections for establishing operative relation between the driving device and either the operating mechanism or the resetting means, mechanism for preventing the disestablishment of such operative relation when established between the driving device and the resetting means, until the latter means has been actuated by the driving device, and a stop device controlled by the manipulative device for arresting the driving device after the latter has operated the resetting means to clear the accumulator.

8. In an accounting machine, the combination with an accumulator, of actuators therefor, operating mechanism for said actuators, resetting means for the accumulator, a driving device common to the operating mechanism and the resetting means, a manipulative device and connections for establishing operative relation between the driving device and either the operating mechanism or the resetting means, mechanism for preventing the disestablishment of such operative relation when established between the driving device and the resetting means, and a stop device controlled by the manipulative device for arresting the driving device after the latter has operated the resetting means to clear the accumulator, the said stop device being capable of actuating the preventing means so as to enable the disestablishment of the operative relation between the operating device and the resetting means.

9. In an accounting machine, the combination with an accumulator, of actuators therefor, a resetting means for said accumulator, an operating device for the resetting means normally out of operative relation therewith, a manipulative device and connections for positively establishing operative relation between said operating device and the resetting means, and means for preventing the disestablishment of such operative relation until the resetting means has been actuated by the operating device.

10. In an accounting machine, the combination with an accumulator, of actuators therefor, a resetting means for said accumulator, an operating device for the resetting means normally out of operative relation therewith, a manipulative device and connections for establishing operative relation between said operating device and the resetting means, and a normally inoperative stop device for arresting the operating device after said device has cleared the accumulator by actuating the resetting means, the said stop device being rendered operative as an incident to the establishment of operative relation between the resetting means and the operating device therefor.

11. In an accounting machine, the combination with an accumulator, of actuators therefor, a resetting means for said accumulator, an operating device for the resetting means normally out of operative relation therewith, a manipulative device and connections for establishing operative relation between said operating device and the resetting means, mechanism for preventing the disestablishment of such operative relation until the resetting means has been actuated by the operating device, and means under the control of the operative device for disabling the preventing mechanism to permit the disestablishment of such operative relation between the operating device and the resetting means.

12. In an accounting machine, the combination with an accumulator, of actuators therefor, a resetting means for said accumulator, an operating device for the resetting means normally out of operative relation therewith, a manipulative device and connections for establishing operative relation between said operating device and the resetting means, mechanism for preventing the disestablishment of such operative relation until the resetting means has been actuated by the operating device, and a movable stop device for arresting the operative device at the end of its movement, the said stop device being capable of disabling the preventing mechanism so as to permit the disestablishment of the operative relation between the operating device and the resetting means.

13. In an accounting machine, the combination with an accumulator, a resetting means therefor, an operating device for said resetting means normally out of operative relation therewith, a manipulative device and connections for establishing operative relation between said operating device and the resetting means, and a concealing means for the accumulator under the control of the manipulative device and constructed so as to be in concealing position when the resetting means and the operating device are out of operative relation and in non-concealing position when the said resetting means and the operating device are in operative relation.

14. In an accounting machine, the combination with an accumulator, of resetting means therefor, an operating device for said resetting means normally out of operative relation therewith, means normally concealing the accumulator, and a manipulative device and connections for establishing operative relation between the resetting means and the operating device and for withdrawing the concealing means, the said manipulative device and connections being capable of withdrawing the concealing means without establishing operative relation between the resetting means and operating device.

15. In an accounting machine, the combination with an accumulator, of a resetting means therefor, an operating device for said resetting means normally out of operative relation therewith, means normally concealing the accumulator, a manipulative device and connections for establishing operative relation between the resetting means and operating device and for withdrawing the concealing means, the said manipulative device and connections being capable of withdrawing the concealing means without establishing operative relation between the resetting means and operating device, and mechanism for preventing the disestablishment of operative relation between the resetting means and operating device until the latter has actuated the former to clear the accumulator.

16. In an accounting machine, the combination with an accumulator, of actuators therefor, operating mechanism for said actuators, resetting means for the accumulator, a driving device common to the operating mechanism and the resetting means, mechanism operable at will for establishing operative relation between the driving device and either the resetting means or the operating mechanism, and means requiring the disestablishment of operative relation between the driving device and the resetting means after the latter has been operated before it can be again operated by the driving device.

17. In an accounting machine, the combination with an accumulator, of actuators therefor, a resetting means for said accumulator, an operating device for the resetting means normally detached therefrom, and positively positioned means for preventing the detachment of said operating device when attached to the resetting means until the latter has been operated by said operating device.

18. In an accounting machine, the combination with an accumulator of actuators therefor, a concealing means for the accumulator, mechanism for resetting the accumulator, an operating device for the resetting mechanism normally detached therefrom, and means for controlling the concealing means as an incident to the connecting of the resetting mechanism and the operating device therefor.

19. In a machine of the class described, the combination with an accumulator, of actuators therefor, operating mechanism for said actuators, resetting means for the accumulator, a driving device common to the operating mechanism and the resetting means, means operable to establish connection between the driving device and either the resetting means or the operating mechanism, and means for preventing disestablishment of the connection when established between the driving device and the resetting means until the resetting means has been actuated by the driving device.

20. In a machine of the class described, the combination with an accumulator, of actuators therefor, operating mechanism for said actuators, resetting means for the accumulator, a driving device common to the operating mechanism and the resetting means, means operable to establish connection between the driving device and either the resetting means or the operating mechanism, a ratchet plate and pawl coöperating to prevent disestablishment of connections established between the driving device and the resetting means until the accumulator has been fully reset, a stop device positioned by the aforesaid connection establishing means for arresting the driving device at the end of a resetting operation, and means whereby said stop device will disengage the aforesaid pawl from its ratchet plate when the driving device is arrested.

21. In a machine of the class described, the combination with an accumulator, of actuators for the accumulator, an operating mechanism for the actuators, resetting means for the accumulator, a driving device common to both the operating mechanism and the resetting means, means normally concealing the accumulator from view, and a manipulative device and connections differentially operable to lock the operating mechanism against actuation, or to withdraw said concealing means, or to both withdraw the concealing means and connect the resetting means to the driving device.

In testimony whereof I affix my signature in the presence of two witnesses.

LOUIS GRUBER.

Witnesses:
ALEXANDER G. MALMSTROM,
CARL W. BEUST.

Copies of this patent may be obtained for five cents each, by addressing the "Commissioner of Patents, Washington, D. C."